INVENTORS
LELAND I. AUSLENDER
BY JOHN G. BOURNE

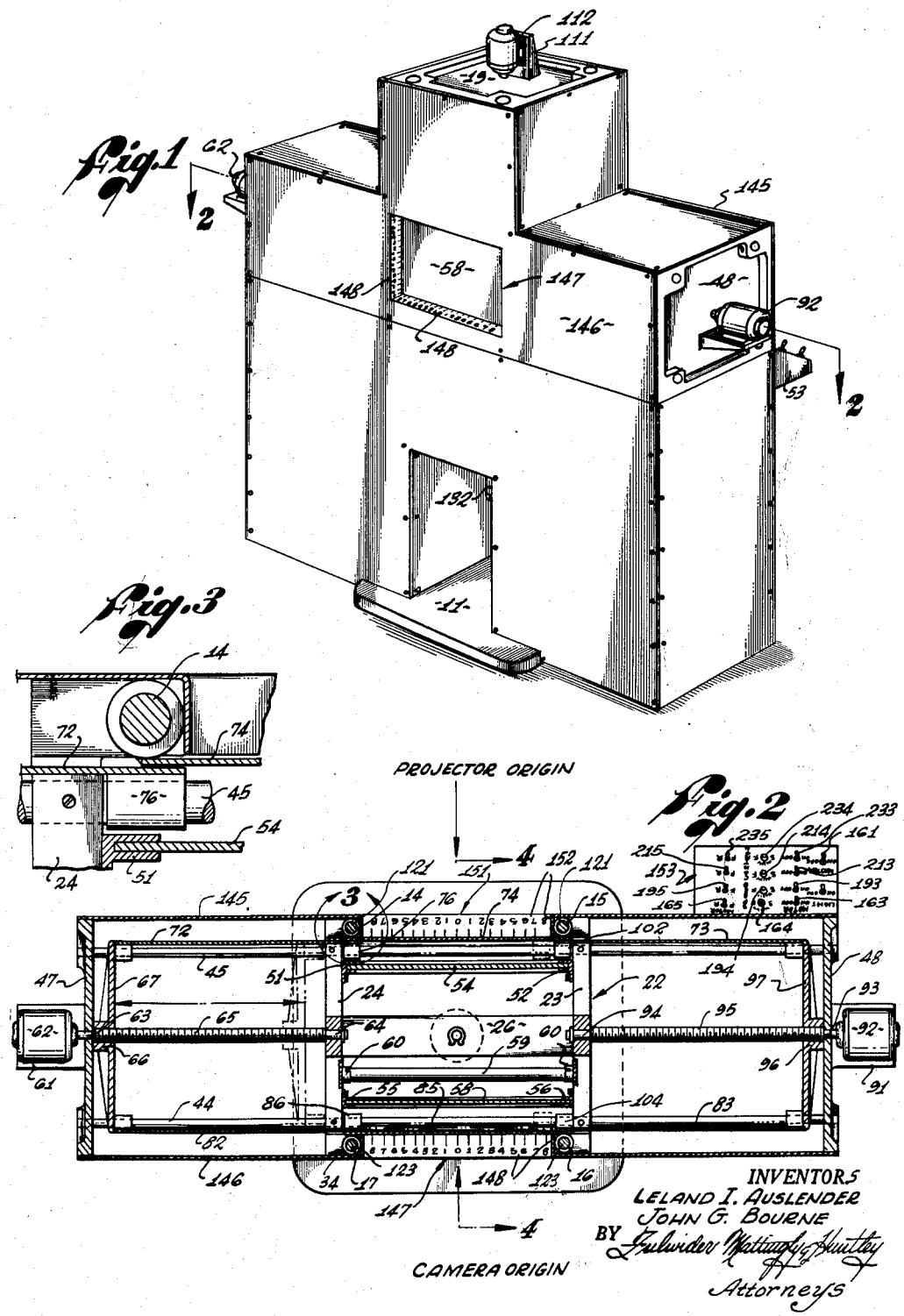
March 3, 1964 — L. I. AUSLENDER ETAL — 3,122,964
METHOD AND APPARATUS FOR PRODUCING MOTION PICTURES
Filed Jan. 31, 1961 — 3 Sheets-Sheet 1
INVENTORS
LELAND I. AUSLENDER
JOHN G. BOURNE

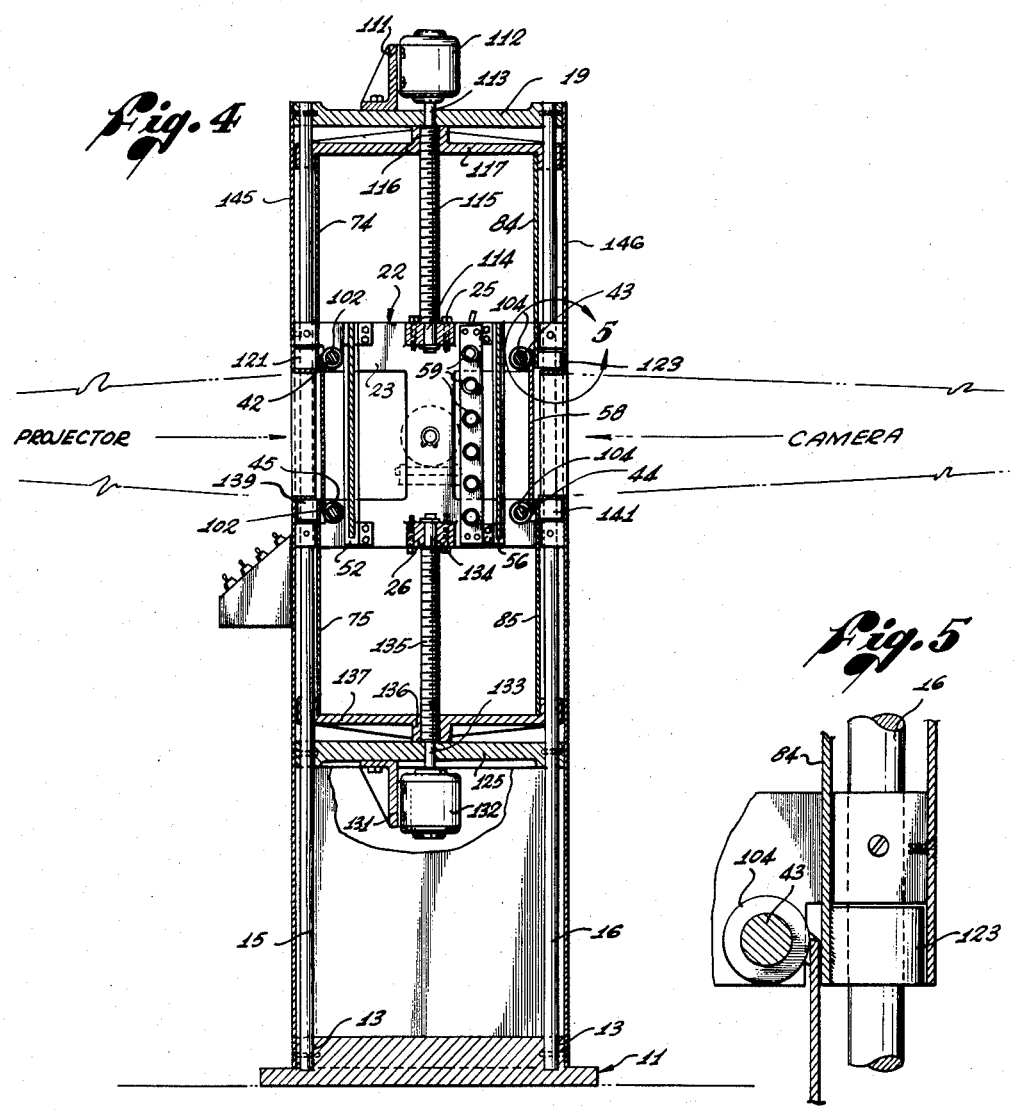
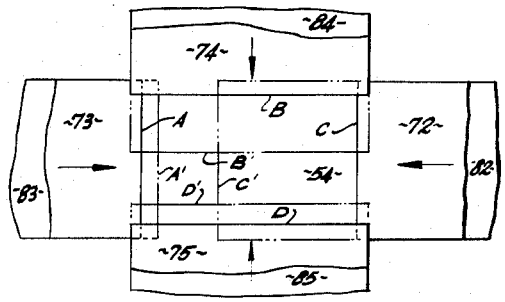
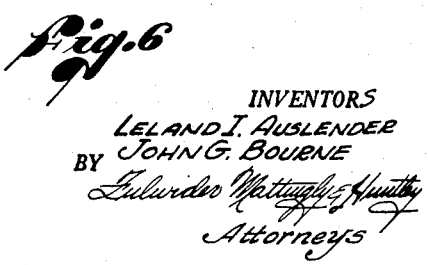
INVENTORS
LELAND I. AUSLENDER
JOHN G. BOURNE
BY
Attorneys March 3, 1964  L. I. AUSLENDER ETAL  3,122,964
METHOD AND APPARATUS FOR PRODUCING MOTION PICTURES
Filed Jan. 31, 1961  3 Sheets-Sheet 3

United States Patent Office 3,122,964
Patented Mar. 3, 1964

3,122,964
METHOD AND APPARATUS FOR PRODUCING MOTION PICTURES
Leland I. Auslender and John G. Bourne, Los Angeles, Calif., assignors to Dynamic Frame Corporation, Los Angeles, Calif., a corporation of California
Filed Jan. 31, 1961, Ser. No. 86,085
16 Claims. (Cl. 88—16)

This invention relates to a method and means for producing a motion picture in which a limited portion only of a scene image is selected for projection, with the remainder of the image masked out, and in which the area and position of the selected portion of the image may be universally varied with respect to the total image area.

In projecting a motion picture according to the present invention, a scene image which would ordinarily occupy the entire area of the projection screen is masked so that only a selected portion of the image appears upon a correspondingly reduced area of the projection screen, with the illumination of the screen limited to the area corresponding to the selected portion of the image and with the remainder of the screen dark. The illuminated area, as herein specifically disclosed a rectangle, may be varied in area and shape as desired and may be moved anywhere over the surface of the screen to follow the position on the film of the portion of the image which it is desired to project. This provides for the emphasizing or dramatizing of a portion only of a scene image by masking out the extraneous portion of the image and limiting the viewer's attention to the selected image portion.

In carrying out the method of this invention, a "rush" print of a filmed motion picture scene is projected upon a miniature screen which is coverable in any desired part by a plurality of reciprocable, plate-like masks having co-operating edges angularly disposed to each other to form therebetween a rectangular area containing the portion of the scene to be emphasized. The movements of the masks with respect to the projected image are duplicated with respect to similar masks movable over an illuminated surface so as to expose on the illuminated surface the size, shape and position of the area exposed on the projection screen. The exposed illuminated surface is photographed on motion picture film and a "traveling matte" is thus produced which is combined with the original scene image to produce a final image showing only the selected portion of the original scene surrounded by a dark frame.

It is therefore an object of the invention to provide an improved method and apparatus for masking a portion of a motion picture image.

Another object of the invention is to provide an improved method and apparatus for projecting a motion picture image which comprises a selected portion only of a photographed scene by masking out those portions of the scene image which surround the portion selected for viewing.

A further object of the invention is the provision of an improved method of masking a portion of a motion picture image which provides for full freedom of size, shape and location with respect to the total area of the scene image, and which is both practical and economical in its operation.

It is still another object of the invention to provide improved apparatus for producing a traveling matte for use with a motion picture record of a scene so that only a selected area of the scene is visible, the remainder of the image of the scene constituting a dark or substantially opaque frame surrounding the selected area.

An additional object of the invention is to provide improved apparatus for producing a traveling matte of the character described, the apparatus including means for masking a light source in the same manner that the image is masked, and photographing the light source.

These and other objects and features of the invention will be readily apparent to those skilled in the art from the following description of a presently preferred form of our invention and the annexed drawings, in which:

FIGURE 1 is a perspective view of the apparatus of the invention, principally from the traveling matte producing side thereof;

FIGURE 2 is a horizontal sectional view taken generally on the line 2—2 of FIGURE 1;

FIGURE 3 is an enlarged detail sectional view of the elements within the circle indicated at 3 in FIGURE 2;

FIGURE 4 is a vertical sectional view on the line 4—4 of FIGURE 2;

FIGURE 5 is an enlarged detail sectional view of the elements within the circle identified as 5 in FIGURE 4;

FIGURE 6 is a representation of positions assumed by the masks of the apparatus with respect to the projection screen and the light source;

Figure 7:
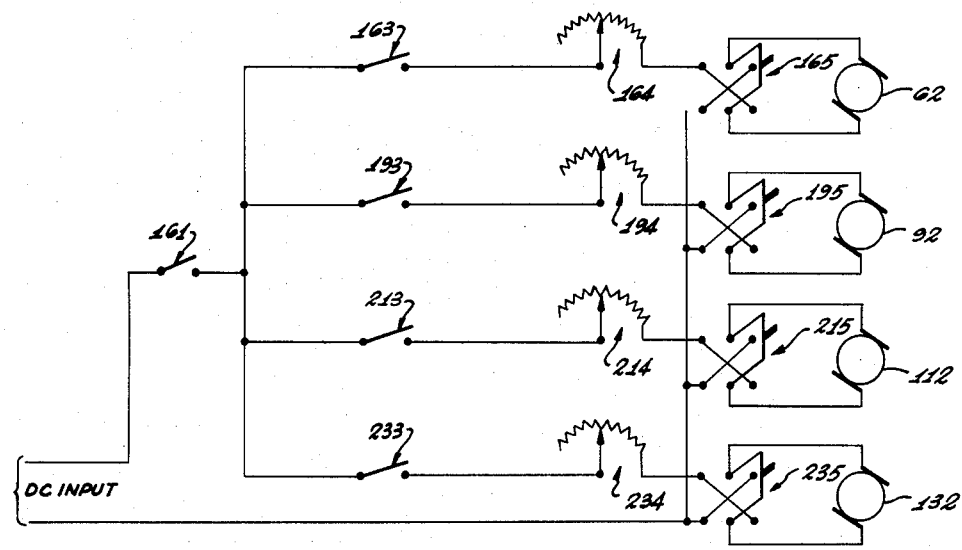
FIGURE 7 is a simplified wiring diagram for the motors operating the masks.

The presently preferred form of apparatus for producing the traveling matte according to this invention is shown in perspective in FIGURE 1. This figure, showing principally the side on which the rectangular illuminated surface is photographed, also shows some of the motors which individually move the masks horizontally and vertically across the illuminated surface to define an area that is photographed to produce the desired traveling matte.

Specifically, the apparatus is illustrated as mounted upon a central main base 11 having rectangularly spaced, vertically directed sockets 13 therein (shown in FIGURE 4) in which are disposed the lower ends of four vertical standards 14, 15, 16 and 17 in the form of elongated cylindrical rods. A top plate 19 receives and retains the upper ends of the standards 14—17.

A supporting frame 22 is mounted upon the standards 14—17 intermediate the ends thereof. The supporting frame 22 is made up of horizontally spaced, vertically disposed side plates 23 and 24 of general I-shape (FIGURE 4) joined together by top and bottom straps 25 and 26. The four corners of each of the side plates 23 and 24 are provided with integral lugs having vertically extending bores therethrough which receive the standards 14—17 to support the frame 22 thereon.

Four horizontally extending, rectangularly spaced, cylindrical rods 42, 43, 44 and 45 are supported on the frame 22 by passing through horizontal bores at the corners of the side plates 23 and 24. Opposite end plates 47 and 48 join the ends of the rods 42—45.

A substantially vertically disposed photographic screen 54, of rectangular shape, is mounted within opposed brackets 51 and 52 supported upon the opposed inner faces of the side plates 23 and 24 inwardly of the rods 42 and 45.

A substantially vertically disposed translucent plate 58, of glass or plastic material and rectangular in shape, is mounted within opposed brackets 55 and 56 mounted on the opposed inner faces of the side plates 23 and 24 inwardly of the rods 43 and 44. A series of spaced fluorescent light tubes 59, extending in a vertical plane, are mounted in sockets 60 in back of the plate 58 for illuminating it.

A horizontal bracket 61 is mounted upon the outer face of the end plate 47, and supported thereon is an electric motor 62 having an elongated shaft 63 journaled at its end 64 in a suitable bearing opening in the vertical web of the support side plate 24. The portion of the shaft 63 intermediate its ends is formed as a worm gear 65 upon which is threaded a traveling nut 66 preferably formed as an integral boss centrally located on a vertically disposed, horizontally movable plate 67 slidably mounted on the rods 42—45.

A pair of horizontally movable masks 72 and 73 and a pair of vertically movable masks 74 and 75 are disposed in front of the rods 42 and 45 and are individually movable to obscure those portions of the projection screen 54 in front of which they are disposed. Similarly, a pair of horizontally movable masks 82 and 83 and a pair of vertically movable masks 84 and 85 are disposed in front of the rods 43 and 44 and are individually movable to obscure those portions of the illuminated plate 58 in front of which they are disposed.

The masks 72 and 82 are mounted at their outer edges to opposite sides of the plate 67 and are supported at their inner edges by sleeves 76 and 86, respectively, slidably mounted on the horizontal rods.

A horizontal bracket 91 is mounted upon the outer face of the end plate 48, and supported thereon is an electric motor 92 having an elongated shaft 93 journaled at its end 94 in a suitable bearing opening passing through the central vertical web of the support side plate 23. Intermediate its ends the shaft 93 is formed as a worm gear 95 upon which is threaded a traveling nut 96 preferably formed as an integral boss centrally mounted on a vertically disposed, horizontally movable plate 97 slidably mounted on the rods 42—45.

The masks 73 and 83 are mounted at their outer edges to opposite sides of the plate 97 and are supported at their inner edges by sleeves 102 and 104, respectively, slidably mounted on the horizontal rods.

A vertical bracket 111 is mounted upon the upper surface of the top plate 19 and supported thereon is an electric motor 112 which has an elongated shaft 113 journaled at its inner end 114 within a bearing bore extending through the horizontal strap 25 connecting the support side plates 23 and 24. Intermediate its end the shaft 113 is formed as a worm gear 115 upon which is threaded a traveling nut 116 preferably formed as an integral boss centrally mounted upon a horizontally disposed, vertically movable plate 117 slidably mounted on the standards 14—17.

The masks 74 and 84 are mounted at their upper edges to opposite sides of the plate 117 and are connected at their lower edges to sleeves 121 and 123, respectively, slidably mounted on the vertical standards.

A supporting plate 125 is mounted on the standards 14—17 beneath the supporting frame 22. Upon the lower face of the plate 125 is mounted a vertical bracket 131 upon which is rigidly supported an electric motor 132 having an elongated shaft 133 whose upper end 134 is journaled within a bearing bore passing through the strap 26. Intermediate its ends the shaft 133 is formed as a worm gear 135 upon which is threaded a traveling nut 136 preferably formed as an integral boss centrally mounted upon a horizontally disposed, vertically movable plate 137 slidably mounted on the standards 14—17.

The masks 75 and 85 are mounted at their lower edges to opposite sides of the plate 137 and are connected at their upper edges to sleeves 139 and 141, respectively, slidably mounted on the vertical standards.

The apparatus is enclosed within sheet metal finishing plates suitably bolted to stationary parts and to each other so as to be readily removable to provide easy access to the interior of the enclosure. The upper finishing plates at the opposite faces of the enclosure are indicated at 145 and 146. Opposite the illuminated plate 58 the finishing sheet 146 is provided with an opening 147 exposing the plate between the inwardly directed flanges 148 integral with the plate 146 and bent inwardly from the plane thereof. Similarly, the finishing plate 145 opposite the projection screen 54 is provided with an opening 151 exposing the screen between flanges 152 integral with the plate 145 and bent inwardly from the plane thereof. The flanges 147 and 148 are provided with suitable indicia reading in opposite directions from the center lines thereof so as to provide rectangular co-ordinates of the positions of the masks with respect ot the openings 147 and 151. From these co-ordinates the positions of the masks with relation to the projection screen 54 can be transferred in direct or inverted relation to position the masks with respect to the illuminated plate 58.

Preferably all of the masks 72—75 and 82—85 have their surfaces of light absorbing material such as black velvet cloth or other covering.

At the projector face of the enclosure there is provided a control panel carrying a plurality of electric switches and potentiometers controlling the operation of the motors 62, 92, 112 and 132 which respectively control the movements of the masks 72, 82; 73, 83; 74, 84; and 75, 85. In the simplified wiring diagram of FIGURE 7 there is shown a master switch 161 controlling the energization and de-energization of all the motor circuits. The motor 62 is provided with an individual on-off switch 163 and its speed of rotation is controlled by a potentiometer 164. The direction of rotation of the motor 62 is controlled by the reversing switch 165. Similarly, the motor 92 is provided with an individual on-off switch 193, a potentiometer 194 and a reversing switch 195. The motor 112 is individually controlled by on-off switch 213, potentiometer 214 and reversing switch 215. Motor 132 is individually controlled by on-off switch 233, potentiometer 234 and reversing switch 235. It will be understood that the wiring diagram may be further simplified by omitting the individual on-off switches 163, 193, 213 and 233 and effecting their function of individual energization and de-energization of their associated motors by the corresponding reversing switches. Also, while a simplified manual control circuit has been shown, the method and apparatus of the invention may obviously be operated by suitable sequence panels programmed in any desired manner to carry out a desired sequence of movement of the masks.

As shown in full lines in FIGURES 2, 4 and 6, the masks 72 and 73 are in their fully retracted position exposing the full horizontal width of the projection screen 54. Similarly, the vertically movable masks 74 and 75 are in their fully retracted position exposing the full vertical height of the projecting screen. The area thus exposed is designated by the lines A, B, C, D in FIGURE 6. The phantom position in broken lines indicates one extended position for all four masks in which they obscure the major portion of the screen area and expose a small rectangular image in the lower left hand corner of the screen bounded by the lines A', B', C' and D'. The corresponding position of the mask 72 and the parts associated therewith is shown in dotted lines in FIGURE 2 and the movement of the mask from the full line into the dotted line position will now be described:

In moving the mask 72 inwardly to the dotted line position of FIGURES 2 and 6, the reversing switch 65 is operated to connect the motor 62 for rotation in a forward direction. The potentiometer 164 is adjusted to give the desired speed of movement of the mask, which in the initial set-up will not be governed by the speed of movement of the selected portion of the scene image. The master switch 161 is closed and upon closure of the switch 163 the motor 62 will be energized to rotate its shaft 63 and therewith the worm gear 65. This effects movement of the traveling nut 66 rectilinearly along the worm gear away from the motor 62, and moves the plate 67 and the mask 72 toward the right as viewed in FIGURE 2. When the mask 72 reaches the position indicated by the line C' the switch 163 is opened and the mask stops in this adjusted position. Movement of the masks 73, 74 and 75 is effected in a similar manner by comparable energization of their respective motors 92, 112 and 132. Retracting movement of the masks is effected by energization of their operating motors after their respective reversing switches have been operated to reverse positions.

Since the operating motors 62, 92, 112, and 132 are individually controlled as to direction and speed of rotation and points of starting and stopping, the masks 72—75 may be individually adjusted to any selected positions so as to produce an exposed image at the dotted lines A′, B′, C′, D′ which, while always rectangular in form, may be of any size and shape and located over any desired area upon the entire face of the projection screen 54. Thus if the initial adjusted position is the area defined by the phantom lines A′, B′, C′, D′ in FIGURE 6 and it is desired to move this area as such in a horizontal direction to the right, the motor 62 will be energized to rotate in the reverse direction to retract the mask 72 and the motor 92 will be energized to rotate in a forward direction to project the mask 73 inwardly. If the motors are rotated at the same speed, the result will be a movement of the exposed image area in the same size and shape across the face of the projection screen. If the motor 62 is rotated faster than the motor 92, the area will expand in a horizontal direction and if the motor 92 is rotated faster than the motor 62, the area will be diminished in a horizontal direction, at the same time that it is moved across the projection screen. Similarly, when it is desired to move the exposed image area in a vertical direction, the motors 112 and 132 are energized to rotate in the desired direction to move the masks 74 and 75 to correspondingly move the area defining lines or edges B′ and D′.

When all four motors are energized to rotate in the proper directions at the same speed, the exposed image area will have the same dimensions but will move across the projection screen and across the scene image at a 45° angle. This angle can be changed by changing the relation between the speeds of rotation of the pair of horizontal motors and the pair of vertical motors. So long as the motors in each pair are rotating in reverse directions at the same speed, the size and shape of the selected image will not change. When the speeds of the motors are varied within the pair, the corresponding masks will move at different speeds and the exposed area will correspondingly increase or decrease in the dimension in which the motors whose speeds are varied are operating. Any combination of movements and speeds of such movements can be accomplished, in any planned sequence as desired, to produce any size and shape of rectangular exposed area and this exposed area may be located at any part of the total scene image.

Thus, an object in the scene may be selected for viewing emphasis and the rest of the scene obscured by appropriately positioning the masks 72—75 to leave an exposed image area including only the desired subject to be emphasized. As this subject moves across the scene in any direction, the masks may be appropriately moved by their individually actuating motors to cause the exposed image area to follow the subject in its movement across the scene. As explained, this may be accomplished by the relative speeds of the pairs of horizontal and vertical motors regardless of the angular direction of movement of the subject across the scene image. Similarly, should the subject increase or decrease in size the relative speeds of movement of the masks within the horizontal pair or the vertical pair or in both, as the case may be, may be varied to increase or decrease the exposed area or to change its shape, and this may be accomplished at the same time the area is moved across the scene image.

While the movements of the masks have been explained with relation to the masks 72—75 at the projecting face of the apparatus, it will be understood that the "slave" masks 82—85 at the camera face of the apparatus will partake of the same movements as those given to the "master" masks 72—75. There is, however, a horizontal inversion of the location of the exposed area since, when this area is to the left of the center line of the screen as viewed from the projector, then on the opposite face, as viewed from the camera, the corresponding exposed area will be located at the right hand side of the center line of the illuminated plate. This inversion and its effect on the method of operation of the invention will be explained more fully hereinafter.

In carrying out the method of this invention to mask a portion of a motion picture image to select a subject within a scene for emphasis, an image of the entire scene is first projected upon the screen 54 and the masks 72—75 are individually moved to expose upon the screen only that portion of the scene image which has been selected for emphasis. As the scene progresses and the subject moves with respect thereto, the masks are moved to follow the subject upon the scene image and to vary, if necessary, the size and shape of the exposed portion of the image. These movements of the various masks may be set up in a program based, for example, on the time of running of the film or upon the subject matter of the scene image, so that the movements of the masks can be duplicated at a later time whether or not the scene image is being projected. In addition to this program or schedule, the various positions of the masks may be identified by the indicia co-ordinates appearing on the flanges 152.

Such program or schedule may be carried out for the length of the scene if it is desired to secure a continuous photograph for the traveling matte, but, in simpler form, the movements of the masks can be broken up and the filming of the traveling matte done in successive steps as changes are made in the directions or rates of movement of the masks. Thus, one programming or scheduling sequence could take a subject in one direction across the scene and this portion of the traveling matte be photographed. A subsequent movement of the subject in another direction could be set up as a separate program and be separately filmed. Any combination of these arrangements, including an automatic programming of sequential operation of the masks to cover an entire scene, are contemplated within the method of this invention.

With a program set up for movement of the masks 82—85 to expose a selected illuminated area, the masks and the area may be photographed in any of a number of ways to produce a traveling matte to be combined with the film of the scene. As the masks 72—75 are moved across the projection screen 54 the masks 82—85 have a similar movement in front of the illuminated plate 53 but the position of the exposed area is inverted from left to right. If the exposed illuminated area is photographed directly, the traveling matte will be inverted and to combine this with the film of the scene will require that the traveling matte be physically reversed front for back. Where this is not mechanically or optically objectionable, this simple direct photography may be used.

Another way in which the traveling matte may be directly photographed is to reverse the projected print physically back for front in the projector so that a reversed image is projected on the screen 54. With the masks 72—75 following the reversed scene image, the reversed area exposed by the masks 82—85 will be in a direct or re-reversed position with respect to the scene so that the area may be photographed directly to produce a traveling matte which may be directly combined with the film of the scene to produce the desired image constituting a selected subject or portion of the entire scene image.

A third manner in which the camera may photograph the traveling matte with the masking portion properly located upon the film is to transfer the mask position co-ordinates and the directions and speed of movements of the motors from the projection side, where the program or schedule is set up, to the camera side of the apparatus. The co-ordinates of the vertically movable masks will remain the same as will the movements of the motors 112 and 132. However, the position of the mask 72 will now be transferred to the mask 83 and the position of the mask 73 will be transferred to the mask 82. Similarly, the energization and de-energization and the speed of rotation of the motors 62 and 92 will be reversed. With this reversal, the selected exposed area will now appear in its proper horizontal relation with respect to the illuminated plate 53 and the traveling matte will have its masking portion in proper position with respect to the vertical center line since the reversal has been taken care of mechanically. It will, of course, be understood that in this method of operation the masks 72 and 73 would be following a reversed schedule and accordingly would no longer properly frame the scene image.

In all of the methods of photographically preparing the traveling matte where a program or schedule is set up for the operation of the masks, the projection of the scene image may be discontinued and the schedule alone followed. However, to insure that the schedule is being properly followed, the selected portion of the scene image may be viewed while the mask is being photographed in all except the third method herein set forth.

Figure 8:
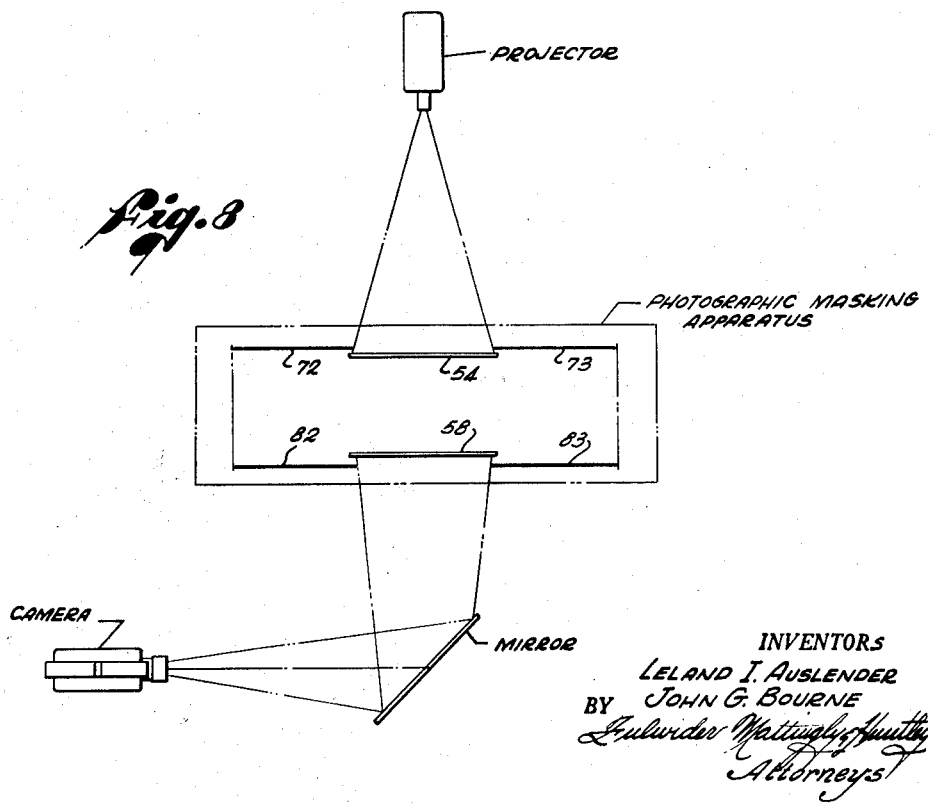
FIGURE 8 is a schematic representation of an alternative arrangement in which the illuminated surface is photographed through an image inverting mirror.

A fourth method of photographing the exposed illuminated area to secure a direct rather than a reversed image is illustrated in FIGURE 8 wherein the scene image is projected on the screen 54 as previously described and is masked by movements of the masks 72 and 73 to expose only the subject or image portion selected. The masks 82 and 93 will follow the movements of the masks 72 and 73, respectively, to form a horizontally reversed reproduction of the exposed area in front of the illuminated plate 78. To produce a direct traveling matte the illuminated area is photographed through a mirror, as illustrated, the reversal normally produced by the mirror serving to re-reverse the position of the exposed area to produce a direct masking image at the camera.

The traveling matte is then combined with the film of the scene in any desired manner to reach the end result of the projection of a selected portion only of the scene image. This may be done, by way of example, by double printing in which negatives of the film of the scene and of the traveling matte are superimposed to produce a final print having an opaque masking portion defining the area of the scene image selected for projection. An alternate method of combining the film of the scene and the traveling matte is by what is known in the art as the Imbibition Dye Transfer Process. A further method of combining the film of the scene and the traveling matte is to produce individual prints thereof which are run through a projector together in synchronized relation, with the light passing through the original film print being limited to the selected area by the opaque masking portion of the traveling matte.

While a certain preferred method and apparatus according to the present invention have been described in accordance with the patent statutes it will be understood that the invention is not limited thereto, as many variations will be apparent to those skilled in the art and the invention is to be given its broadest interpretation within the terms of the following claims.

We claim:

1. The method of masking a motion picture image so that only a selected area of the total scene is visible, the remainder of the area being a dark frame surrounding the selected area, the method including the steps of: projecting the scene upon a viewing screen; masking portions of said screen to leave uncovered only the area of said screen corresponding to the selected area of the total scene; continuously adjusting said masking as projection continues; masking a lighted screen in the same manner as said viewing screen; photographing said lighted screen and thereby providing an image of a plain area corresponding to said selected area; and combining the image of the total scene with the image of said plain area to provide a final image in which said selected area is surrounded by a dark frame that varies to define the movable edges of said selected area.

2. The method of masking a portion of a motion picture scene image comprising: projecting a motion picture scene upon a viewing screen; masking portions of said screen by continuously varying the shape and position of the area exposed between the masked portions; mechanically duplicating the shape and position of the exposed area of the screen by correspondingly exposing an area of a lighted surface between masked portions thereof; photographing the exposed area of said lighted surface to effect an exposure of the corresponding area of a film negative to produce an opaque condition thereat surrounded by a transparent area; and combining the original scene image and the image of the exposed lighted surface area in synchronized relation to produce a resultant image corresponding to the selected portion only of the total scene image.

3. The method of masking a portion of a motion picture scene image comprising: projecting a motion picture scene upon a substantially rectangular screen; masking portions of said screen by continuously varying the four effective edges of the screen to limit the viewable projection to a selected portion of the total image; duplicating the variations in the area and position of said selected portion upon a lighted surface by varying the four effective edges of a rectangular area on said surface; photographing the effective area of said surface to effect an exposure of the corresponding area of a film negative to produce an opaque condition thereat surrounded by a transparent area; and combining the original scene image and the image of the effective lighted surface area in synchronized relation to produce a resultant image corresponding to the selected portion only of the total scene image.

4. The method of masking a portion of a motion picture scene image comprising: projecting a motion picture scene upon a substantially rectangular screen; masking portions of said screen by continuously varying the four effective edges of the screen to limit the viewable projection to a selected portion of the total image; duplicating the variations in the area and position of the effective screen upon a lighted surface by varying the four effective edges of a rectangular area on said surface; photographing the effective area of said surface to effect an exposure of the corresponding area of a film negative to produce an opaque condition thereat surrounded by a transparent area; and combining the original scene image and the image of the effective lighted surface area in synchronized relation to produce a resultant image corresponding to the selected portion only of the total scene image, said combination being effected with respect to corresponding selected frames of said original film and the mask film to produce a resultant image varying continuously and universally in its relation to the total image.

5. The method of masking a portion of a motion picture scene image comprising: projecting a motion picture scene upon a substantially rectangular screen; masking portions of said screen by continuously varying the four effective edges of the screen to limit the viewable projection to a selected portion of the total image; duplicating the variations in the area and position of the effective screen upon a lighted surface by varying the four effective edges of a rectangular area on said surface; taking a motion picture photograph of the effective area of said surface to effect an exposure of the corresponding area of a film negative to produce an opaque condition thereat surrounded by a transparent area; and combining the negative of the original scene image and the negative of the image of the effective lighted surface area by corresponding frames to produce a projection film print of said selected image portion.

6. The method of masking a portion of a motion picture scene image comprising: projecting a horizontally inverted motion picture scene upon a substantially rectangular screen; masking portions of said screen by continuously varying the four effective edges of the screen to limit the viewable projection to a selected portion of the total image; mechanically duplicating the variations in the area and position of the effective screen upon a lighted surface facing in the opposite direction to the facing of the screen by varying the four effective edges of a rectangular area on said surface, whereby the position of the effective surface area is horizontally reversed with respect to the position of the area of the effective screen; taking a motion picture photograph of the effective area of said surface to produce a direct image thereof upon a film; and combining the original scene image and the image of the effective lighted surface area in synchronous relation to produce a resultant image corresponding to the selected portion only of the total image.

7. The method of masking a portion of a motion picture scene image comprising: projecting a horizontally inverted image of a motion picture scene upon a viewing screen by physically reversing the film back for front in the projector; masking portions of said screen by continuously varying the shape and position of the area exposed between the masked portions; mechanically duplicating the shape and position of the exposed area of the screen upon a lighted surface facing in the direction opposite to the direction in which the screen faces, whereby the position of the area upon the lighted surface is horizontally reversed with respect to the position of the area upon the screen; taking a motion picture photograph of the effective area of said lighted surface to effect an exposure of the corresponding area of a film negative to produce an opaque condition thereat surrounded by a transparent area; and combining the original scene image and the image of the effective lighted surface area in synchronous relation to produce a resultant image corresponding to the selected portion only of the total image.

8. The method of masking a portion of a motion picture scene image comprising: projecting a motion picture scene upon a viewing screen; masking portions of said screen by continuously varying the exposed area of the screen to limit the viewable projection to a selected portion of the total image; mechanically duplicating the variations in the exposed area of the screen upon a lighted surface facing in the direction opposite to the direction in which the screen faces, whereby the position of the exposed area on the lighted surface is horizontally reversed with respect to its position on the screen; producing a mirror image of the exposed area of said lighted surface, taking a motion picture photograph of said mirror image to effect an exposure of the corresponding area of a film negative to produce an opaque condition thereat surrounded by a transparent area; and combining the original film image and the mirror image of the exposed lighted surface area in synchronous relation to produce a resultant image corresponding to the selected portion only of the total image.

9. Apparatus for producing an image for masking a portion of a motion picture scene image comprising: a projection screen; an illuminated surface; masking means for said screen; masking means for said surface; means for moving said screen masking means to expose a selected portion only of said screen and of an image projected thereon; and means coupling said masking means so that said surface masking means follow the movements of said screen masking means to expose an area of said surface comparable to the exposed area of said screen, whereby the image of said surface may be synchronously combined with the scene image to produce a resultant image of the exposed portion only of the scene image.

10. Apparatus for producing an image for masking a portion of a motion picture scene image comprising: a projection screen; a motion picture projector focused on said screen to project a scene image thereon; masking means for said screen; means for moving said screen masking means to expose a selected area only of said screen and of an image projected thereon; an illuminated surface; a motion picture camera focused on said surface; masking means for said surface movable to expose varying areas thereof; and means coupling said screen and surface masking means so that said surface masking means follow the movements of said screen masking means to expose an area of said surface comparable to the exposed area of said screen, whereby the photographed image of said surface may be synchronously combined with the scene image to produce a resultant image of the exposed portion only of the scene image.

11. Apparatus for producing an image for masking a portion of a motion picture scene image comprising: a projection screen; a pair of masks each horizontally movable in opposite directions in front of said screen to obscure the adjacent portions thereof; a pair of masks each vertically movable in opposite directions in front of said screen to obscure the adjacent portions thereof; means for independently moving each of said masks to expose a selected portion only of said screen of any desired area and location across the face of the screen; an illuminated surface; a pair of masks each horizontally movable in opposite directions in front of said surface; a pair of masks each vertically movable in opposite directions in front of said surface, said last two mentioned pairs of masks obscuring the portions of the surface adjacent thereto and exposing the area of the surface lying between their edges; means coupling said screen masks and said surface masks to reproduce in the surface masks the movements of their complementary screen masks to expose an area of said illuminated surface comparable to the selected exposed area of said screen, whereby the image of said surface area may be synchronously combined with the scene image to produce a resultant image of the exposed portion only of the scene image.

12. Apparatus for producing an image for masking a portion of a motion picture scene image comprising: a projection screen; a pair of masks each horizontally movable in opposite directions in front of said screen to obscure the adjacent portions thereof; a pair of masks each vertically movable in opposite directions in front of said screen to obscure the adjacent portions thereof, the masking edges of said masks extending in straight lines at right angles to their direction of movement so that said edges cooperate to produce an exposed screen area of rectangular shape; means for independently moving each of said masks to expose a selected portion only of said screen of any desired area and location across the face of the screen; an illuminated surface; a pair of masks each horizontally movable in opposite directions in front of said surface; a pair of masks each vertically movable in opposite directions in front of said surface, said last two mentioned pairs of masks obscuring the portions of the surface adjacent thereto and exposing the area of the surface lying between their edges, said surface mask edges extending in straight lines at right angles to the direction of movement of the masks; means coupling said screen masks and said surface masks to reproduce in the surface masks the movements of their complementary screen masks to expose an area of said illuminated surface comparable to the selected exposed area of said screen, whereby the image of said surface may be synchronously combined with the scene image to produce a resultant image of the exposed portion only of the scene image 13. Apparatus for producing an image for masking a portion of a motion picture scene image comprising: a first pair of vertically extending, horizontally spaced standards; a second pair of vertically extending, horizontally spaced standards which are in turn spaced from said first pair to mount the standards in a rectangular configuration; a first pair of horizontally extending, vertically spaced supports disposed adjacent to and transverse of said first pair of standards; a second pair of horizontally extending, vertically spaced supports disposed adjacent to and transverse of said second pair of standards; a projection screen located adjacent said first pair of standards in a plane parallel to the planes containing said first pair of standards and said first pair of supports; a pair of masks mounted on said first pair of standards and each independently movable relative thereto in opposite vertical directions in front of said screen to obscure the adjacent portions thereof; a pair of masks mounted on said first pair of supports and each independently movable relative thereto in opposite horizontal directions in front of said screen to obscure the adjacent portions thereof; a light source; a pair of masks mounted on said second pair of standards and each independently movable relative thereto in opposite vertical directions to obscure portions of said light source; a pair of masks mounted on said second pair of supports and each independently movable relative thereto in opposite horizontal directions to obscure portions of said light source; means connecting the masks mounted on said first pairs of standards and supports to the masks mounted on said second pairs of standards and supports; and means for moving said connected masks to define, by the masks mounted on said second pairs of standards and supports, an open area in front of said light source comparable to the area selected for exposure on said screen, whereby an image of said light source may be synchronously combined with a scene image to produce a resultant image of a selected portion only of the scene image.

14. Apparatus for producing an image for masking a portion of a motion picture scene image comprising: a first pair of vertically extending, horizontally spaced standards; a second pair of vertically extending, horizontally spaced standards which are in turn spaced from said first pair to mount the standards in a rectangular configuration; a first pair of horizontally extending, vertically spaced supports disposed adjacent to and transverse of said first pair of standards; a second pair of horizontally extending, vertically spaced supports disposed adjacent to and transverse of said second pair of standards; a projection screen located adjacent said first pair of standards in a plane parallel to the planes containing said first pair of standards and said first pair of supports; a pair of masks mounted on said first pair of standards and each independently movable relative thereto in opposite vertical directions in front of said screen to obscure the adjacent portions thereof; a pair of masks mounted on said first pair of supports and each independently movable relative thereto in opposite horizontal directions in front of said screen to obscure the adjacent portions thereof; a light source; a pair of masks mounted on said second pair of standards and each independently movable relative thereto in opposite vertical directions to obscure portions of said light source; a pair of masks mounted on said second pair of supports and each independently movable relative thereto in opposite horizontal directions to obscure portions of said light source; means connecting corresponding masks on said first and second pairs of standards and supports in pairs for common movement; and an individually controlled electric motor for moving each pair of corresponding masks to define, by the masks mounted on said second pairs of standards and supports, an open area in front of said light source comparable to the area selected for exposure on said screen, whereby an image of the light source may be synchronously combined with a scene image to produce a resultant image of a selected portion only of the scene image.

15. Apparatus for producing an image for masking a portion of a motion picture scene image comprising: a first pair of vertically extending, horizontally spaced standards; a second pair of vertically extending, horizontally spaced standards which are in turn spaced from said first pair to mount the standards in a rectangular configuration; a first pair of horizontally extending, vertically spaced supports disposed adjacent to and transverse of said first pair of standards; a second pair of horizontally extending, vertically spaced supports disposed adjacent to and transverse of said second pair of standards; a projection screen located adjacent said first pair of standards in a plane parallel to the planes containing said first pair of standards and said first pair of supports; a pair of masks mounted on said first pair of standards and each independently movable relative thereto in opposite vertical directions in front of said screen to obscure the adjacent portions thereof; a pair of masks mounted on said first pair of supports and each independently movable relative thereto in opposite horizontal directions in front of said screen to obscure the adjacent portions thereof; a light source; a pair of masks mounted on said second pair of standards and each independently movable relative thereto in opposite vertical directions to obscure portions of said light source; a pair of masks mounted on said second pair of supports and each independently movable relative thereto in opposite horizontal directions to obscure portions of said light source; means connecting corresponding masks on said first and second pairs of standards and supports in pairs for common movement, the connecting means for each pair of corresponding masks including a traveling nut; a worm gear meshing with each of said traveling nuts; and an individually controlled electric motor for rotating each of said worm gears to effect rectilinear movement of its associated traveling nut and of the pair of corresponding masks connected thereto.

16. Apparatus for producing an image for masking a portion of a motion picture scene image comprising: a projection screen; a pair of masks each horizontally movable in opposite directions in front of said screen to obscure the adjacent portions thereof; a pair of masks each vertically movable in opposite directions in front of said screen to obscure the adjacent portions thereof; means for independently moving each of said masks to expose a selected portion only of said screen of any desired area and location across the face of the screen; an illuminated surface; a pair of masks each horizontally movable in opposite directions in front of said surface; a pair of masks each vertically movable in opposite directions in front of said surface, said last two mentioned pairs of masks obscuring the portions of the surface adjacent thereto and exposing the area of the surface lying between their edges; means providing coordinate indicia adjacent to both said projection screen and said illuminated surface for determining the positions of the masks relative thereto so that a scheduled position of a mask relative to the projection screen may be readily translated to an adjusted position of the corresponding mask relative to the illuminated surface, whereby the image of said surface area may be synchronously combined with the scene image to produce a resultant image corresponding to the exposed portion only of the screen.

References Cited in the file of this patent
UNITED STATES PATENTS
2,334,962    Seitz _____ Nov. 23, 1943